United States Patent
Kutomi et al.

(10) Patent No.: US 6,705,657 B2
(45) Date of Patent: Mar. 16, 2004

(54) VEHICLE SEAT STOWING STRUCTURE

(75) Inventors: Shingo Kutomi, Aichi (JP); Takashi Ogino, Okazaki (JP)

(73) Assignee: Mitsubishi Jidosha Kogyo Kabushiki Kaisha (JP)

(*) Notice: Subject to any disclaimer, the term of this patent is extended or adjusted under 35 U.S.C. 154(b) by 0 days.

(21) Appl. No.: 10/393,801

(22) Filed: Mar. 21, 2003

(65) Prior Publication Data

US 2003/0193206 A1 Oct. 16, 2003

(30) Foreign Application Priority Data

Mar. 29, 2002 (JP) .................... 2002-097118

(51) Int. Cl.[7] ............................... B60N 2/10
(52) U.S. Cl. ....................... 296/65.09; 297/15
(58) Field of Search .................. 296/66, 65.09, 296/65.01; 297/15, 335

(56) References Cited

U.S. PATENT DOCUMENTS

| | | | | |
|---|---|---|---|---|
| 5,269,581 A | * | 12/1993 | Odagaki et al. | 296/66 |
| 6,318,784 B2 | * | 11/2001 | Nishide | 296/65.09 |
| 6,394,525 B1 | * | 5/2002 | Seibold | 296/65.09 |
| 6,416,107 B1 | * | 7/2002 | Kanaguchi et al. | 296/65.09 |
| 2003/0094830 A1 | * | 5/2003 | Kamida et al. | 296/65.09 |

FOREIGN PATENT DOCUMENTS

| | | |
|---|---|---|
| DE | 100 59 335 A1 | 8/2001 |
| DE | 100 56 084 A1 | 5/2002 |
| EP | 0 990 551 A1 | 4/2000 |
| JP | 2001-63421 A | 3/2001 |
| JP | 2001-301504 | 10/2001 |
| WO | WO02/14104 A1 | 2/2002 |

* cited by examiner

Primary Examiner—Joseph D. Pape
(74) Attorney, Agent, or Firm—Rossi & Associates

(57) ABSTRACT

A vehicle seat stowing structure has seats provided on a floor. The seats are rotated rearwardly of a vehicle around a rotational shaft fixed to a vehicle body so that the bottom surface of each of seat cushions is directed to the inside of a passenger compartment. The seats are stowed in a recess formed in the floor. The floor is formed so that at least a part thereof extending between a portion provided forwardly of a place, at which the seats are installed, and a front edge of the recess is flat. A casing is provided at a place, which is located forwardly of the recess and faces the bottom surfaces of the seat cushions, on the floor.

11 Claims, 5 Drawing Sheets

VEHICLE SEAT STOWING STRUCTURE

BACKGROUND OF THE INVENTION

1. Field of the Invention

The present invention relates to a vehicle seat stowing structure, and more particularly to a stowing structure in which a seat can be rotated to be stowed.

2. Description of the Related Art

In recent years, constructions have been getting common on vehicles of station wagon and van types in which a third-row seat is provided in a space behind a second-row seat in the passenger compartment.

However, the third-row seat so provided occupies a luggage space. Thus there is caused a problem that when a piece of large-sized luggage or a number of pieces of luggage are attempted to be loaded in the vehicle in addition to passengers, the luggage cannot be loaded as desired.

To cope with this problem, a seat stowing structure is disclosed in, for example, JP-A-2001-63421 in which a recessed stowage portion is provided in the surface of a floor of a vehicle at a position behind a third-row seat so that the third-row seat can be folded and rotated backward to thereby be stowed in the recessed stowage portion.

In the structure disclosed in the aforementioned publication, the depth of the recessed stowage portion is increased by raising the level of a floor surface in front of the recessed stowage portion.

However, to increase the depth of the recessed stowage portion in this way, a floor panel constituting the floor surface must be formed by extensive deep drawing. Therefore, such a structure has problems in that when the floor panel is press-molded, cracks are liable to occur therein, and that the yield thereof becomes low.

SUMMARY OF THE INVENTION

The invention has been made to solve the above problems. According to a first aspect of the invention, there is provided a vehicle seat stowing structure comprising: a seat disposed on a floor and including a seat cushion; a rotational shaft; a recess formed in the floor; and a casing extending in a width wise direction of a vehicle, wherein the seat is rotated around the rotational shaft towards the rear of a vehicle so that a bottom surface of the seat cushion faces the inside of a passenger compartment to thereby be stowed in the recess, the floor is formed so that at least a part thereof extending between a portion provided forwardly of a place, at which the seat is disposed, and a front edge of the recess is flat; and the casing is disposed at a place, which is located forwardly of the recess and which faces the bottom surface of the seat cushion, on a surface of the floor.

Therefore, even when the depth of the recess formed in the floor is not large, sufficient depth for stowing the seat is ensured by cooperation between the recess and the casing provided forwardly of the recess. Thus, the entire seat can be rotation-received in the recess. Consequently, cracks are prevented from occurring when the floor panel is press-molded. Hence, the press-formability of the floor panel is enhanced.

Further, because the floor is formed so that at least a part thereof extending between the portion provided forwardly of the place, at which the seats are disposed, and the front edge of the recess is flat, the necessity for extensive bending-formation of the floor panel is eliminated. Thus, the press-formability of the floor panel is enhanced.

DETAILED DESCRIPTION OF THE PREFFERED EMBODIMENTS

One embodiment of a vehicle seat stowing structure according to the invention will be described below with reference to the accompanying drawings.

Figure 1:
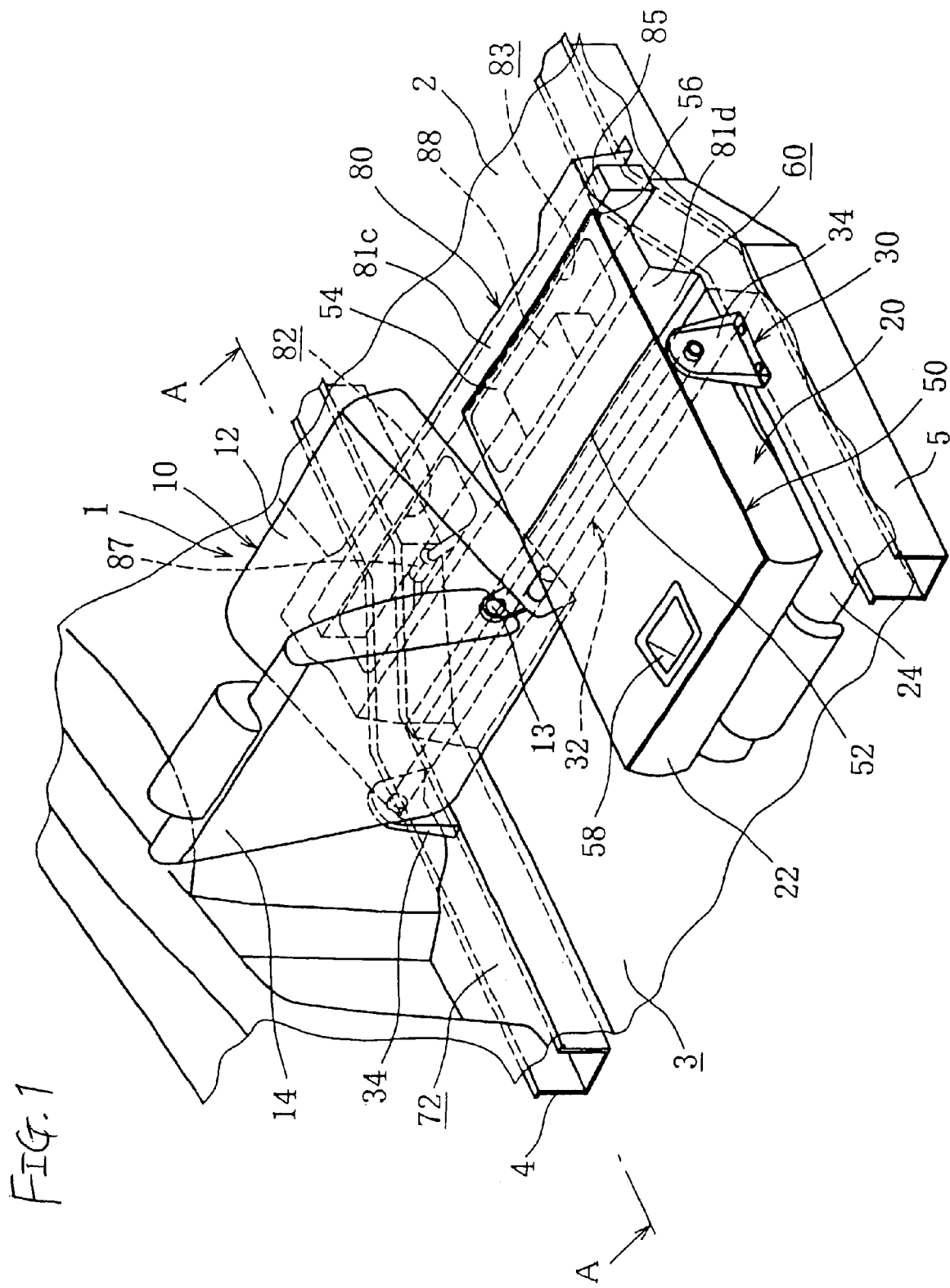
FIG. 1 is a perspective view of a third-row seat unit provided rearward of a second-row seat at a rearmost portion inside a passenger compartment of a station wagon- or van-type vehicle, as viewed from the rear in a diagonal direction.
Figure 2:
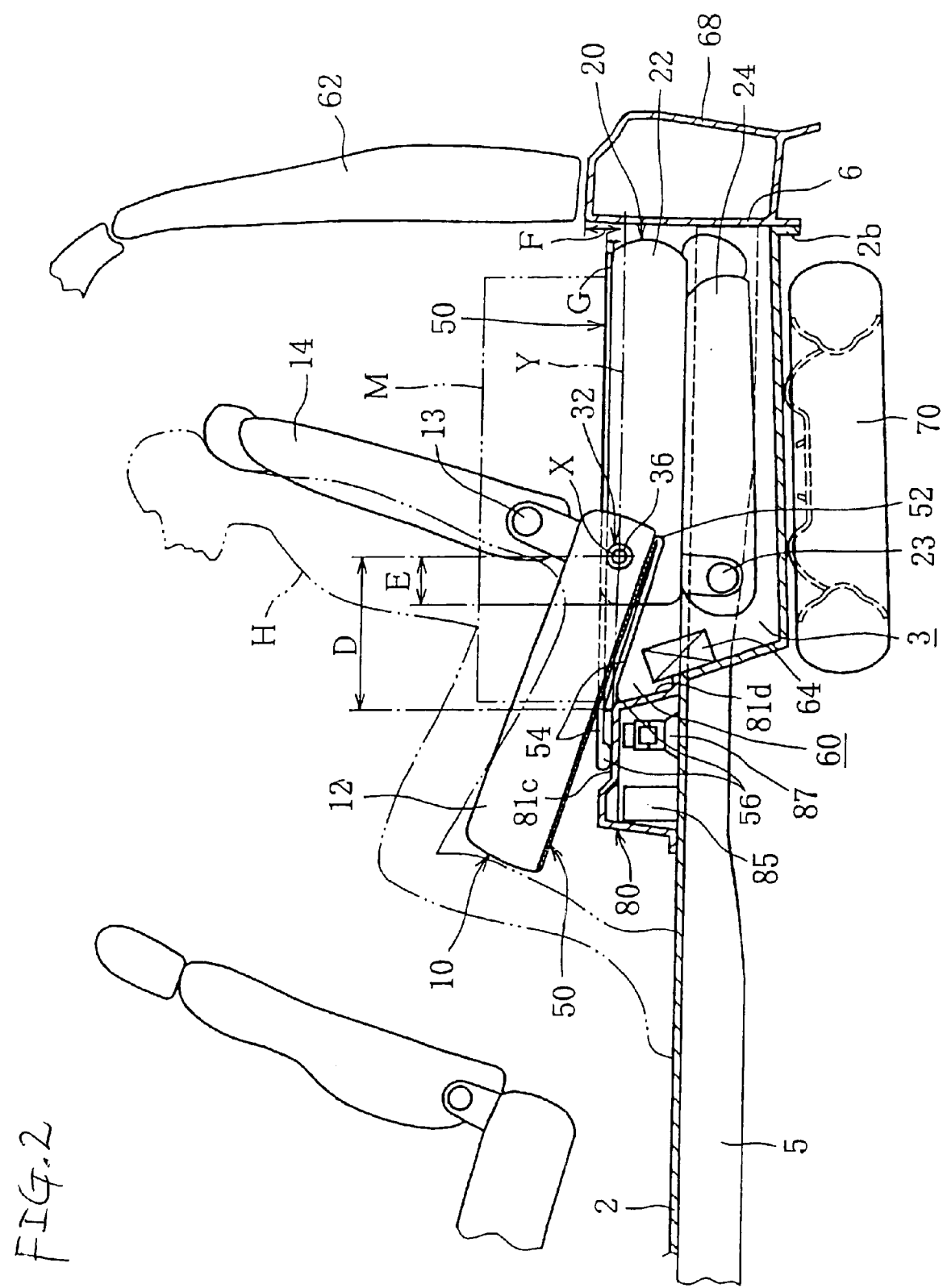
FIG. 2 is a sectional view taken along the line A—A in FIG. 1, or a view showing the third-row seat unit as viewed from the left-hand side.

Referring to FIG. 1, a perspective view of a third-row seat unit 1 as viewed from the rear in a diagonal direction is shown. Referring to FIG. 2, a sectional view taken along the line A—A in FIG. 1, or a view showing the seat unit as viewed from the left-hand side is shown. The embodiment is described by referring to FIGS. 1 and 2.

As shown in FIG. 1, the third-row seat unit 1 is divided, for example, transversely to have two seats or a seat 10 and a seat 20. The seats 10, 20 each include a seat cushion 12, 22 and a seat back 14, 24. To be specific, the seats 10, 20 are each constructed such that the seat cushion 12, 22 and the seat back 14, 24 can be folded around a fulcrum 13, 23. The seat unit 1, namely, the seat 10 and the seat 20 are disposed on an upper surface of a floor panel 2 via a rotational shaft unit 30.

The rotational shaft unit 30 includes a rotational shaft 32 and a pair of support brackets 34, 34. The divided seats 10, 20 are both rotatably supported on the rotational shaft 32.

In the floor panel 2, a recess 3, whose opening space is somewhat larger than the outside dimension of the seat unit 1 in such a way as to receive the folded seats 10 and 20, is formed behind the seat unit 1. The seat unit 1 is disposed on the top surface of the floor panel 2 in proximity of the front edge of the recess 3 through the rotational shaft unit 30 in such a way as to straddle the recess 3.

Paired left and right side members (or frames) 4 and 5 extending along a forward-rearward direction are provided on the bottom surface of the floor panel 2 and jointed to the floor panel 2 by welding etc.

Moreover, a casing 80 is placed on the floor panel 2 under the seat cushions 12 and 22 in such a way as to face the bottom surfaces of the seat cushions 12 and 22, as to be separated from the floor panel 2, and as to have a U-shaped section and extend in a widthwise direction of a vehicle.

Figure 3:
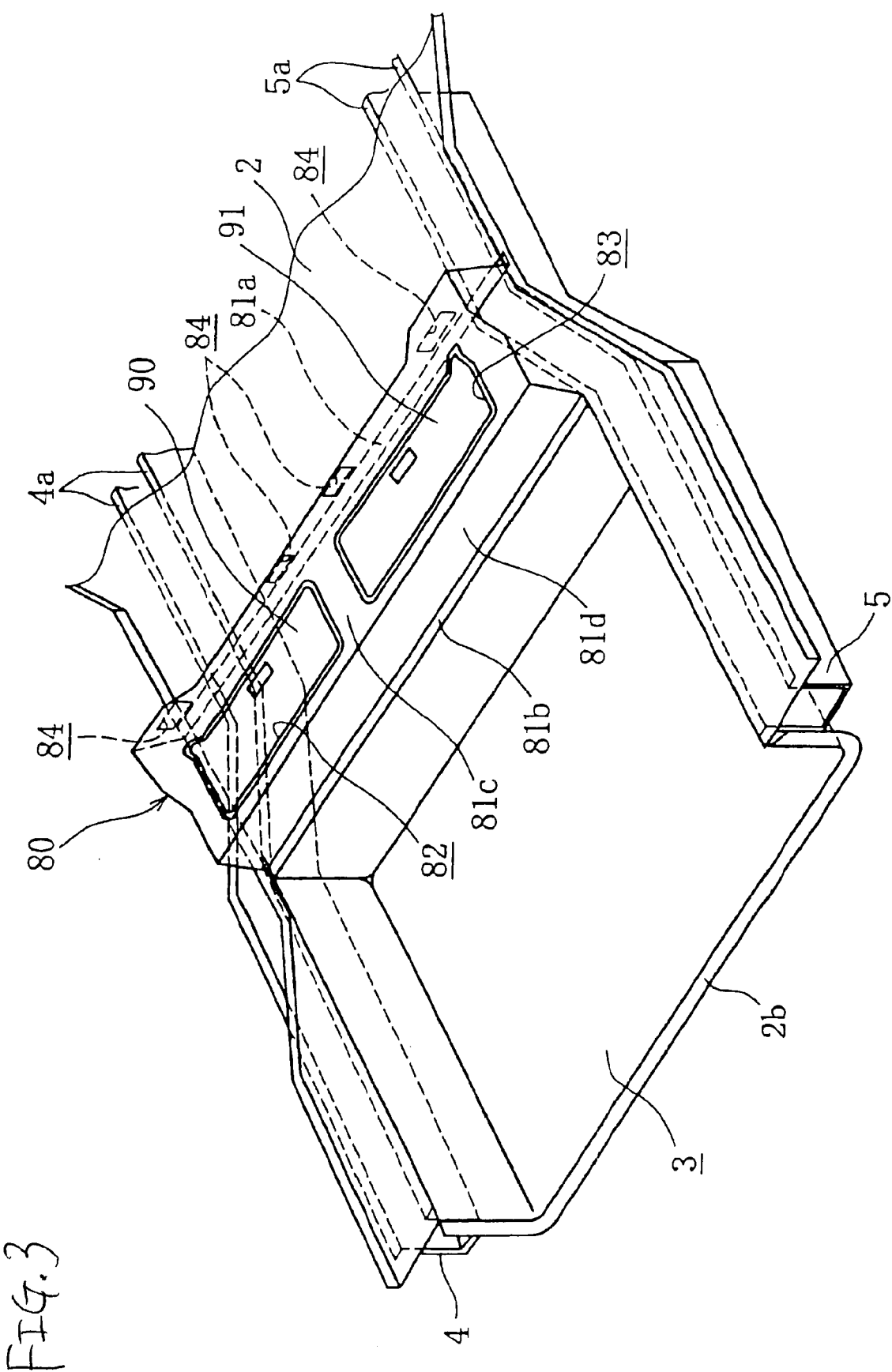
FIG. 3 is a perspective view illustrating an assembly relation among a floor panel, side members and a casing.

Referring to FIG. 3, there is shown a perspective view illustrating an assembly relation among the floor panel 2, the side members 4 and 5, and the casing 80. As illustrated in this figure, the floor panel 2 is formed so that at least the following part thereof is flat. That is, such a part includes a portion located forwardly of the recess 3 under the seat cushions 12 and 22, and covers a range from a portion located forwardly of the seat unit 1 to the front edge of the recess 3. The casing 80 is placed on the top surface of the flat part of the floor panel 2 in such a manner as to extend from the front edge of the recess 3. Flanges 81a and 81b are formed along the floor panel 2 on the front and rear end portions of the casing 80 in such a way as to extend in the direction of vehicle width. The casing 80 is fixed onto the floor panel 2 by fastening these flanges 81a and 81b to the floor panel 2 with bolts. Incidentally, the flanges 81a and 81b may be connected to the floor panel 2 by welding etc.

Opening holes 82 and 83 are formed in a top surface 81c of the casing 80. Lids 90 and 91 are respectively provided thereon in such a way as to close up these opening holes 82 and 83. The lids 90 and 91 are connected to the top surface 81c through, for instance, hinges (not shown), and constructed in such a manner as to be able to be opened and closed by being respectively rotated around the hinges.

Carpet materials are applied onto the whole surfaces of the floor panel 2 and the casing 80.

The side members 4 and 5 have U-shaped cross-sections. Paired flanges 4a, 4a and paired flanges 5a, 5a are formed on both side end portions of the side members 4 and 5 along the floor panel 2 in such a way as to extend in a forward-rearward direction. The side members 4 and 5 are fixed onto the bottom surface of the floor panel 2 by, for example, weld-connecting these flanges 4a, 4a, the flanges 5a, 5a, and the floor panel 2 to one another.

Because the floor panel 2 is formed flat, at least the part of each of these side members 4 and 5, which is placed under the seat cushions 12 and 22, extends in the forward-rearward direction of the vehicle without bending in an upward-downward direction. The side members 4 and 5 bend in the direction of vehicle width. Thus, the side members 4 and 5 are prevented from causing interference with rear wheels (not shown) and the recess 3.

FIG. 2 also shows an imaginary extension face Y horizontally extending from the top surface 81c of the casing 80 rearwardly of the vehicle. The rotational shaft unit 30 is disposed so that the shaft center X of a stationary shaft 36 is located on the imaginary extension face Y or in the vicinity thereof. Further, as shown in this figure, the rotational shaft unit 30 is set so that the distance D between the rear end portion of the top surface 81c of the casing 80 and the shaft center X of the stationary shaft 36 is sufficiently longer than the distance E between the rear end of each of the seat cushions 12 and 22 and the shaft center X (D>E).

Figure 4:
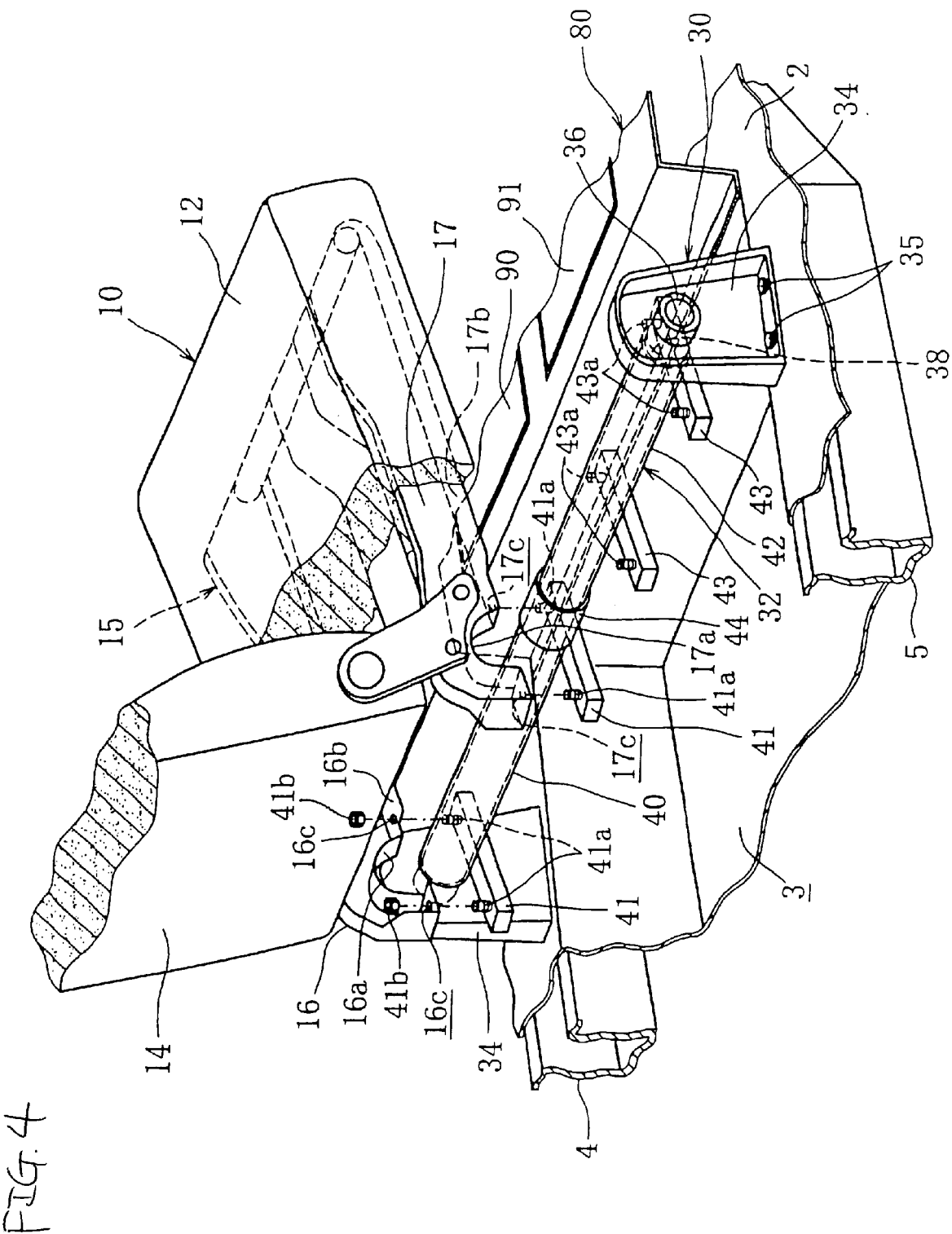
FIG. 4 is a detailed view illustrating a connecting structure between a rotational shaft unit and each of divided seats.

Referring to FIG. 4, there is shown a detailed view of the connecting structure between the rotational shaft unit 30 and each of the seats 10 and 20. Hereinafter, the connecting structure between the rotational shaft unit 30 and each of the seats 10 and 20 is described with reference to this figure. Incidentally, although only the connecting structure between the rotational shaft unit 30 and the seat 10 is described hereinbelow, the connecting structure between the rotational shaft unit 30 and the seat 20 is similar thereto.

As described above, the rotational shaft unit 30 has the rotational shaft 32 and the pair of support brackets 34, 34. The rotational shaft unit 30 is constructed as follows. That is, the stationary shaft (for example, a thick-walled steel tube) 36 is weld-fixed to the support brackets 34, 34. A hollow shaft (for instance, a steel tube) 40 associated with the seat 10, and a hollow shaft (for example, a steel tube) 42 associated with the seat 20 are rotatably fitted onto the stationary shaft 36 through a sleeve 38. Further, a spacer 44 constituted by a hollow tube is fitted onto a part of the stationary shaft 36, which is located between the hollow shafts 40 and 42. That is, the rotational shaft unit 30 is constructed so that the hollow shaft 40 associated with the seat 10, and the hollow shaft 42 associated with the seat 20 can rotate around the stationary shaft 36 independent of each other. Incidentally, each of the stationary shaft 36 and the support brackets 34, 34 has stiffness and strength, which are sufficient to the extent that even when occupants sit on the seats, the stationary shaft 36 and the support brackets 34, 34 are not deformed.

A set of seat brackets 41, 41 for fixing the seat 10, and a set of seat brackets 43, 43 for fixing the seat 20 are weld-connected to the hollow shaft 40 and the hollow shaft 42, respectively. Paired stud bolts 41a, 41a are erected on each of the seat brackets 41, 41 in such a way as to pinch the hollow shaft 40, while paired stud bolts 43a, 43a are erected on each of the seat brackets 43, 43 in such a manner as to pinch the hollow shaft 42.

The support brackets 34, 34 are fastened to the floor panel with bolts 35. Thus, the rotational shaft unit 30 is fixed onto the floor panel 2 in such a way as to straddle the recess 3.

A cushion frame 15 is provided in the seat cushion 12 of the seat 10 by being internally installed in a cushion material constituted by urethane foam. Concave shaft bearing portions 16a and 17a to be fitted onto the hollow shaft 40 are formed in the rear end portions of the paired left and right side frames 16 and 17 of the cushion frame 15, respectively. Further, pairs of bolt holes 16c and 17c are bored in flange portions 16b and 17b, which are formed in lower portions of the side frames 16 and 17, interposing the shaft bearing portions 16a and 17a therebetween. Each of the pairs of bolt holes 16c and 17c is constructed so that the pair of stud bolts 41a, 41a penetrate therethrough.

Thus, the stud bolts 41a, 41a penetrate through each of the pairs of bolt holes 16c and 17c and are screwed into nuts 41b, so that the pair of side frames 16 and 17 are fixed to the hollow shaft 40 through the seat brackets 41, 41. Consequently, the seat 10 is rotatably supported on the stationary shaft 36. Particularly, the pair of side frames 16, 17 is fixed to the hollow shaft 40 so that the concave shaft bearings 16a and 17a are fitted onto and become nearly integral with the hollow shaft 40.

In a state in which the seats 10 and 20 are respectively fixed to the hollow shafts 40 and 42, a relatively stiff plate-like carpet material (first covering member) 50 constituted by a needle-punched carpet is fastened to the bottom surface of each of the seat cushions 12 and 22 with clips, as illustrated in FIG. 1. As shown in this figure, the carpet material 50 extends from the rear end of the bottom surface of each of the seat cushions 12 and 22 by a predetermined dimension and constitutes an extension portion (second covering member) 54. The extension portion 54 is constructed in such a manner as to be able to freely turn around a hinge portion (hinge part) 52 made of a flexible material. Moreover, a thick portion 56 made of resin is provided along a distal end of the extension portion 54. Furthermore, a work handle 58 to be used for rotating each of the seats 10 and 20 is provided in the carpet material 50.

As shown in FIG. 3, a vertical flange 2b is provided at the rear end of the floor panel 2. An end panel (longitudinal wall member) 6 separated from the floor panel 2 is weld-connected to this vertical flange 2b, as illustrated in FIG. 2. That is, the rear edge of the recess 3 is blocked up by the end panel 6. Particularly, as illustrated in FIG. 2, the end panel 6 is set so that the distance F between the imaginary extension face Y and the top of the end panel 6 is equal to or longer than the distance G between the imaginary extension face Y and an end of the bottom surface of each of the seat cushions 12 and 22 when the seats 10 and 20 are stowed in the recess (F≧G). Incidentally, the end panel 6 is constructed in such a manner as to be integral with, for instance, a sash lower portion 68 of a rear gate 62.

Hereinafter, an operation of the vehicle seat stowing structure according to the invention, which is configured in this manner, is described by referring to FIGS. 1 and 2.

As described above, the seat 10 is supported on the stationary shaft 36 through the hollow shaft 40 in such a way as to be freely rotated independent of the seat 20. On the other hand, the seat 20 is supported on the stationary shaft 36 through the hollow shaft 42 in such a way as to be freely rotated independent of the seat 10. Therefore, both the seats 10 and 20 can be used for sitting. Further, both the seats 10 and 20 can be simultaneously stowed in the recess 3 by rearwardly rotated around the stationary shaft 36 while being respectively folded around the fulcrums 13 and 23. Alternatively, one of the seats 10 and 20 can be used for sitting, while the other seat can be stowed in the recess 3.

Further, when the seats 10 and 20 are stowed in the recess 3 in this way, the necessary depth of the recess for stowing the seats 10 and 20 is equal to a sum of the thickness of each of the seat cushions 12 and 22 and the thickness of each of the seat backs 14 and 24. In this case, the casing 80 is placed on the floor panel 2 at the side of the front edge of the recess 3. Furthermore, as illustrated in FIG. 2, a spare tire is attached to the outside of the recess 3 instead of the inside thereof. Therefore, even when the depth of the recess 3 is not large, the cooperation between the depth of the recess 3 and the height of the casing 80 provides sufficient stowing depth.

That is, there is no need for forming the recess 3 by extensively deep-drawing. Consequently, cracks are prevented from occurring when the floor panel is press-molded. Hence, the press-formability of the floor panel is enhanced. The yield thereof is prevented from being degraded.

Further, there is no necessity for deep-drawing of the rear end of the floor panel 2, because the end panel 6 separated from the floor panel 2 is weld-connected to the rear end thereof. It is sufficient to perform only the cutting-off (or trimming) thereof to thereby form only the vertical flange 2b. Thus, the press-molding of the floor panel 2 is facilitated. Consequently, the press-formability of the floor panel 2 is enhanced.

Moreover, the distance F between the imaginary extension face Y and the top of the end panel 6 is set to be equal to or longer than the distance G between the imaginary extension face Y and an end of the bottom surface of each of the seat cushions 12 and 22 at the time of stowing the seats 10 and 20 in the recess. Thus, when the seat 10 and the seat 20 are stowed in the recess 3, the end of each of the seat cushions 12 and 22 is completely hidden under the end panel 6. Thus, sufficient stowing depth is obtained.

Furthermore, the part, on which the casing 80 is placed under the seat cushions 12 and 22, of the floor panel 2 is formed flat. Thus, there is no need for extensively performing the bending-formation of the floor panel 2. Thus, the press-formability of the floor panel 2 is enhanced.

Further, because the part, on which the casing 80 is placed under the seat cushions 12 and 22, of the floor panel 2 is formed flat, the side members 4 and 5 extending along the bottom surface of the floor panel 2 in the forward-rearward direction of the vehicle passes straight without bending in the upward-rearward direction. When halfway parts of the side members 4 and 5 bend in an upward-downward direction, stress concentration occurs in such bent parts. Consequently, the strength of the side members 4 and 5 is degraded. However, according to this structure of the invention, an occurrence of such stress concentration can be prevented as much as possible. The frame strength of the side members 4 and 5 can be sufficiently ensured.

Furthermore, a part of the top surface of the side member 4, which extends along a side edge of the recess 3, can be utilized as an auxiliary luggage space 72. Consequently, when both the seats 10 and 20 are used for sitting, an elongated luggage, such as a golf bag, can be placed by utilizing both the recess 3 and the auxiliary luggage space 72, so that the elongated luggage extends in the direction of vehicle width.

In the case illustrated in FIGS. 1 and 2, the seat 10 is used as that for an occupant H. At that time, the extension portion 54 of the carpet material 50 provided on the bottom surface of the seat cushion 12 bends at the hinge portion 52, as illustrated in FIG. 2. The thick portion 56 at the end thereof slides on the top surface 81c of the casing 80 and is then placed at the rear end portion of the top surface 81c.

The seat 20 is stowed in the recess 3 by being reversed while being folded. Thus, the bottom surface of the seat cushion 22 is directed to the inside of the passenger compartment. The rotational shaft 32 penetrates through the rear side surfaces of the seat cushions 16 and 17, that is, the rear side surface of the seat cushion 22. Consequently, even when the seat 20 is stowed, the rotational shaft 32 does not project into the passenger compartment. A flat luggage space is formed on the carpet material 50.

Further, because the distance D between the rear end of the top surface 81c of the casing 80 and the shaft center X is set to be sufficiently longer than the distance E from the rear end of each of the seat cushions 12 and 22 to the shaft center X, an opening 60 is defined between the rear wall surface 81d of the casing 80 and the rear end of each of the seat cushions 12 and 22 when the seats 10 and 20 are stowed in the recess 3. However, the extension portion 54 extends forwardly and covers the opening 60 by simultaneously causing the thick portion 56 to slide on the top surface 81c. Thus, a large luggage space including the extension portion 54 is formed on the carpet material 50.

As shown in FIG. 2, a small article 64, such as a triangular signpost, can be received in the opening 60. In this case, the extension portion 54 bends at the hinge portion 52. The small article 64 received in the opening 60 can easily be taken in and out by lifting the extension portion 54 and then causing the extension portion 54 to turn around the hinge portion 52.

Figure 5:
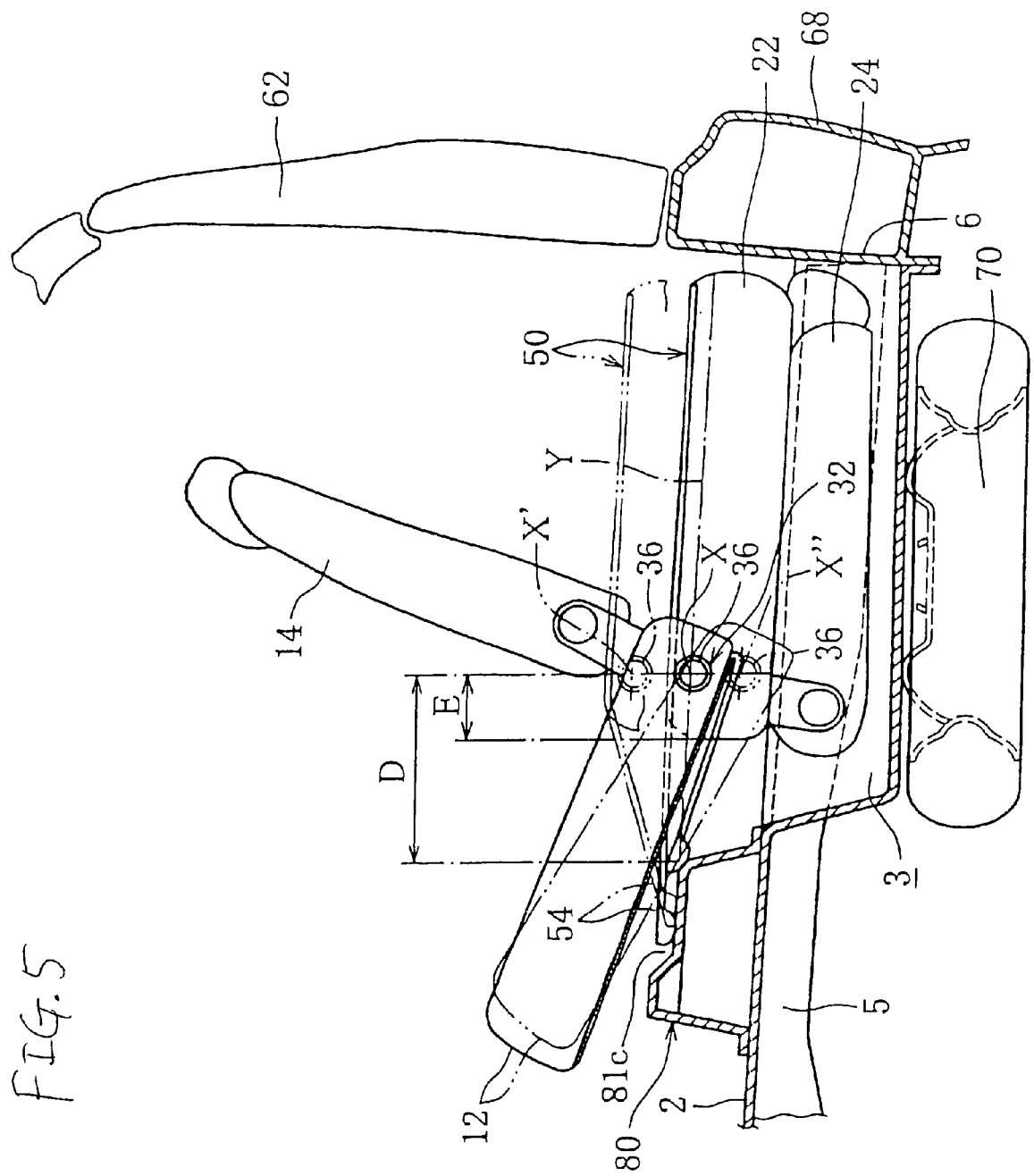
FIG. 5 is an enlarged view of FIG. 2.

Further, as described above, the shaft center X of the stationary shaft 36 is positioned on the imaginary extension face Y or in the proximity thereof. Referring to FIG. 5, which is an enlarged view of FIG. 2, there are shown both the shaft center X' in the case that the shaft center X of the stationary shaft 36 is located on the imaginary extension face Y and that the shaft center of the stationary shaft 36 is located at a place higher than the imaginary extension face Y, and the shaft center X" in the case that the shaft center X of the stationary shaft 36 is located on the imaginary extension face Y and that the shaft center of the stationary shaft 36 is located at a place lower than the imaginary extension face Y. As illustrated in this figure, in the case of the shaft center X', the bottom surfaces of the seat cushions 12 and 22 become higher than the top surface 81c of the casing 80 when the seats 10 and 20 are stowed in the recess 3. Thus, the extension portion 54 of the carpet material 50 inclines (as indicated by double dashed chain lines), so that the luggage slips down and does not become stable. In the case of the shaft center X", the bottom surfaces of the seat cushions 12 and 22 become lower than the top surface 81c of the casing 80 when the seats 10 and 20 are stowed in the recess 3. Thus, the luggage does not become stable. Furthermore, when used for sitting, the front ends of the seat cushions 12 and 22 jump up too much and steeply incline (as indicated by double dashed chain lines) and occupants have the bad feeling of sitting. Conversely, in the case of the embodiment of the invention, an extensive and flat luggage space is formed on the carpet material 50 and on the top surface 81c of the casing 80 without causing such a problem.

Further, the distance F from the imaginary extension face Y to the top end of the end panel 6 is set to be equal to or longer than the distance G from the imaginary extension face Y to the end of the bottom surface of each of the seat cushions 12 and 22 when the seats 10 and 20 are stowed. Thus, when a luggage is loaded in the vehicle by opening the rear gate 62, pieces of luggage can smoothly be loaded on the bottom surfaces of the seat cushions 12 and 22.

Incidentally, the position of the imaginary extension face Y may be set in such a way as to coincide with the position of the top of the end panel 6. In this case, the position of the end of the bottom surface of each of the seat cushions 12 and 22 can be set to be slightly higher than the position of the top of the end panel 6. Thus, not only the loading but the discharge of pieces of luggage can smoothly be performed.

Furthermore, because the opening holes 82 and 83 are formed in the top surface 81a of the casing 80, a space provided in the casing 80 can effectively be used for receiving equipment. For example, tools, such as a jack 87, and equipment, such as a CD changer 88, can be received therein. Further, the jack 87 and CDs can be loaded thereto and discharged therefrom through the opening holes 82 and 83. Moreover, as illustrated in FIG. 3, an opening hole 84 serving as an outlet vent of an air-conditioner may be provided in a front wall surface of the casing 80. Furthermore, an air-conditioner duct 85 can be provided in the casing 80. Incidentally, although lids 90 and 91 are provided in this embodiment in such a manner as to close the opening holes 82 and 83, the opening holes 82 and 83 can be covered with the extension portion 54 when the seats 10 and 20 are stowed in the recess 3, as illustrated in FIG. 1. Thus, the extension portion 54 may be used as the lids for the opening holes.

In the foregoing description, the embodiment of the vehicle seat stowing structure according to the invention has been described. However, the invention is not limited to the aforementioned embodiment.

For instance, in the description of the embodiment, the third-row seat unit is divided into two seats. The invention may be preferably applied to a case in which a bench seat is used as the seat unit 1.

Further, in the description of the aforementioned embodiment, the seats 10 and 20 are rotatably supported on the stationary shaft 36 through the hollow shafts 40 and 42. The structure may be configured so that the seats 10 and 20 can be rotated around the stationary shaft 36 through a plurality of independent shaft bearing brackets. In the case of employing the bench seat, the structure may be constructed so that both sides of the bench seat are rotatably supported without using the rotational shaft unit 30.

Furthermore, although the seat brackets 41, 41 and the seat brackets 43, 43 are weld-connected to the hollow shafts 40 and 42, these seat brackets are not necessarily jointed to the hollow shafts 40 and 42.

Further, although the stud bolts 41a, 41a and the stud bolts 43a, 43a erected on the seat brackets 41, 41 and the seat brackets 43, 43 are screwed into the nuts 41b in the aforementioned embodiment, the structure may be adapted so that weld nuts are provided in the flanges 16b and 17b serving as lower parts of the side frames 16 and 17, and that bolts are screwed into the weld nuts.

Additionally, although the aforementioned embodiment is constructed so that the end panel 6 is formed in such a way as to be integral with the sash lower portion 68 of the rear gate 62, the end panel 6 may be separated from the sash lower portion 68.

As described above, according to the vehicle seat stowing structure of the invention, even when the depth of the recess formed in the floor is not large, sufficient depth for stowing the seat is ensured by cooperation between the recess and the casing provided forwardly of the recess. Thus, the entire seat can be rotation-received in the recess. Consequently, cracks are prevented from occurring when the floor panel is press-molded. Hence, the press-formability of the floor panel is enhanced. The yield thereof can be prevented from being degraded.

What is claimed is:

1. A vehicle seat stowing structure for a vehicle having a floor comprising:
   a seat having a seat cushion disposed on the floor and movable between a use position and a stow position;
   a rotational shaft;
   a recess formed in the floor; and
   a casing extending in a widthwise direction of the vehicle,
   wherein the seat is rotatable around the rotational shaft toward the rear of a vehicle so that a bottom surface of the seat cushion faces the inside of a passenger compartment in the recess in the stow position,
   wherein a part of the floor extending along a front edge of the recess and under the seat in the use position is flat; and
   wherein the casing is disposed on the floor in front of the recess and faces the bottom surface of the seat cushion in the use position.

2. The vehicle seat stowing structure according to claim 1, further including a frame extending in a lengthwise direction of the vehicle disposed on a bottom surface of the floor, wherein at least a part of the frame extending between a front of the seat in the use position and the front edge of the recess extends along the floor without bending in a vertical direction.

3. The vehicle seat stowing structure according to claim 2, wherein the frame extends flat to a rear edge of the recess along a side edge of the recess without bending in the vertical direction, and a luggage space is formed along a top surface portion of the frame, along the side edge of the recess.

4. The vehicle seat stowing structure according to claim 1, wherein the rotational shaft rotatably supports the seat on a side surface of the seat cushion, and a shaft center of the rotational shaft is located on an imaginary extension face horizontally extending from a top surface of the casing rearwardly of the vehicle.

5. The vehicle seat stowing structure according to claim 1, wherein the seat has a first covering member, which is provided on the bottom surface of the seat cushion, and a second covering member connected to the first covering member through a hinge part provided along a rear end of the seat cushion, when the seat is not stowed in the recess, the second covering member is folded at the hinge part and an end of the second covering member abuts against a top surface of the casing, and when the bottom surface of the seat cushion is directed to the inside of the passenger compartment so as to stow the seat in the recess, the end of the second covering member slides on the top surface of the casing forwardly of the vehicle and extends on the top surface of the casing.

6. The vehicle seat stowing structure according to claim 1, wherein the casing has an opening portion provided in the top surface thereof, and a lid for closing the opening portion.

7. The vehicle seat stowing structure according to claim 1, wherein the rotational shaft rotatably supports the seat on a side surface of the seat cushion, and a shaft center of the rotational shaft is located so that a distance between the shaft center and a rear end of the casing is longer than a distance between the shaft center and a rear end of the seat cushion.

8. The vehicle seat stowing structure according to claim 1, further including a longitudinal wall member provided separately from the floor, wherein the rear edge of the recess is blocked by the longitudinal wall member.

9. The vehicle seat stowing structure according to claim 8, wherein a top end of the longitudinal wall member is located above an imaginary plane horizontally and rearwardly extending from a top surface of the casing.

10. The vehicle seat stowing structure according to claim 1, further including an air-conditioner duct provided in the casing.

11. The vehicle seat stowing structure according to claim 10, further including an opening hole serving as an outlet vent of the air-conditioner duct formed in a front wall surface of the casing.

* * * * *